(No Model.) 2 Sheets—Sheet 1.
G. F. HALL.
BRAKE FOR VELOCIPEDES.
No. 524,527. Patented Aug. 14, 1894.
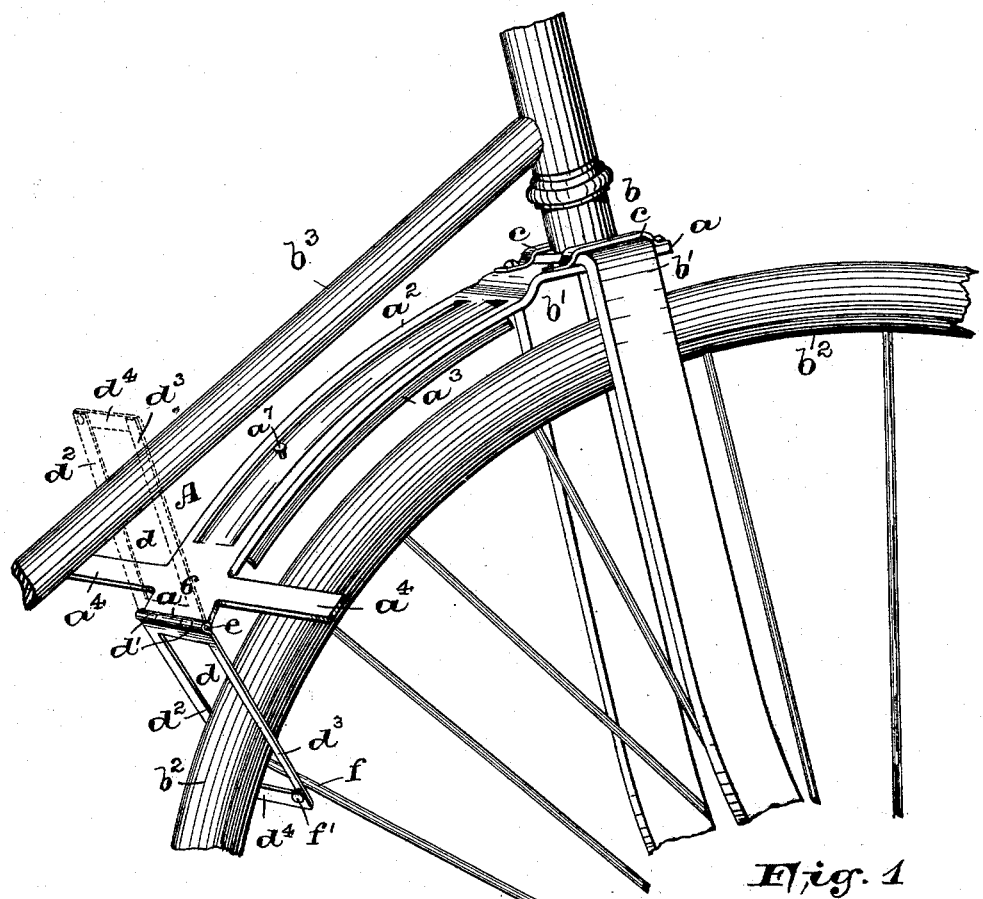
Fig. 1
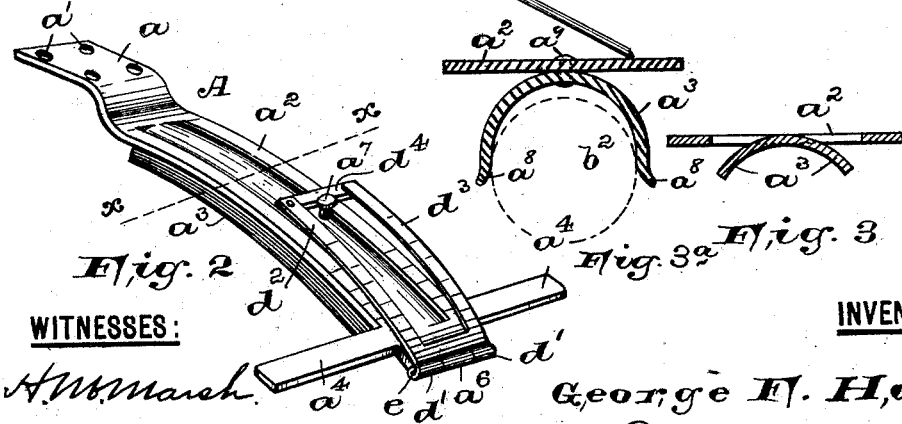
Fig. 2    Fig. 3ª    Fig. 3
WITNESSES:    INVENTOR:
H. M. Marsh    George F. Hall,
Wm. H. Canfield Jr.    BY Fred C. Fraentzel, ATT'Y.

(No Model.) 2 Sheets—Sheet 2.
G. F. HALL.
BRAKE FOR VELOCIPEDES.
No. 524,527. Patented Aug. 14, 1894.
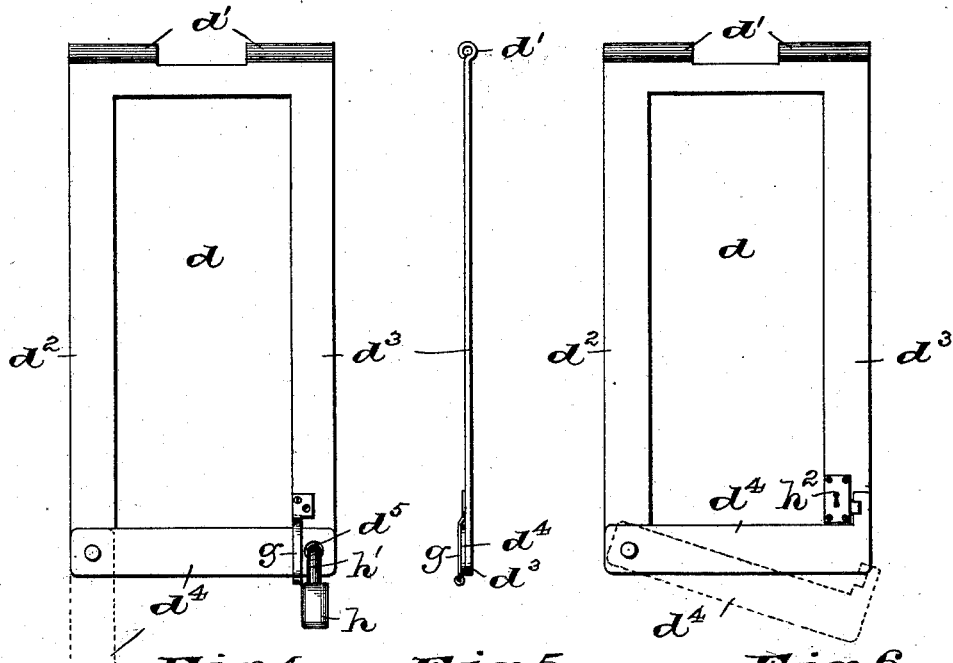
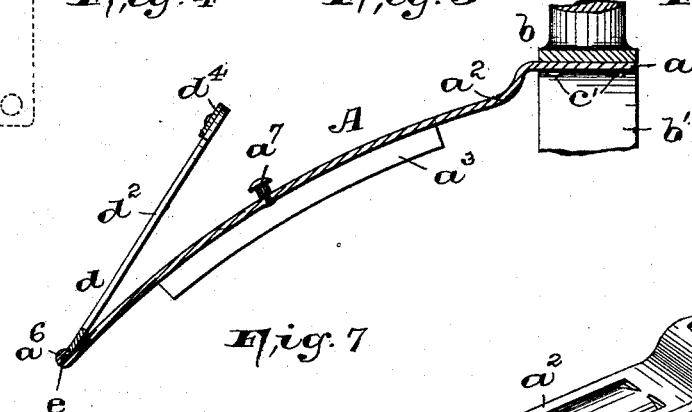
WITNESSES: INVENTOR:
H. W. Marsh George F. Hall,
Wm. C. Camfield Jr BY Fred C. Fraentzel, ATT'Y.

UNITED STATES PATENT OFFICE.

GEORGE F. HALL, OF NEWARK, NEW JERSEY.

BRAKE FOR VELOCIPEDES.

SPECIFICATION forming part of Letters Patent No. 524,527, dated August 14, 1894.

Application filed September 2, 1893. Serial No. 484,660. (No model.)

*To all whom it may concern:*

Be it known that I, GEORGE F. HALL, a citizen of the United States, residing at Newark, in the county of Essex and State of New Jersey, have invented certain new and useful Improvements in Brakes for Velocipedes, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to a novel form of brake for velocipedes, or other like vehicles, which may also be used as a "coaster," and which may be provided with a locking or holding means adapted to be brought into holding engagement with the tire of one of the wheels, to enable bicycle riders to temporarily station their vehicles in upright positions and thereby prevent the turning or "running away" of the steering wheel of the vehicle, while resting the machine against a post, tree or other standing support.

A further object is to provide a locking means adapted to be engaged with the tire of the wheel to prevent the latter from turning upon its axle when the machine has been left standing, to prevent any person from moving the machine, except by the owner of the machine provided with a key to the locking device.

With these ends in view, my invention consists of the improved brake of the construction to be hereinafter fully described and finally embodied in the clauses of the claim, and furthermore, the invention consists of the arrangement and combination of the improved brake and means connected therewith, adapted to engage with the tire of the wheel and to be locked in such engagement, if desired.

The invention further consists in certain other novel arrangements and combinations of parts, as will be hereinafter more fully described and finally set forth in the claims.

In the accompanying drawings, Figure 1 is a perspective view of part of the steering wheel of a velocipede, and my improved device used in connection therewith. Fig. 2 is a perspective view of the device embodying the principles of my invention, and Fig. 3 is a cross-section taken on line $x$ in said Fig. 2. Fig. $3^a$ is a similar cross-section, in which the brake-shoe is made with outwardly flaring ends. Fig. 4 is a detail view of one form of locking means used in connection with my improved form of brake, and Fig. 5 is a side view of the same. Fig. 6 is a view similar to that illustrated in Fig. 4, of a locking means of a slightly modified form of construction. Fig. 7 is a longitudinal vertical section of the brake embodying my invention, illustrating still another means for securing the same to the forked steering frame of the vehicle, and Fig. 8 is a perspective view of my novel form of brake and coaster, in which the locking device, adapted to be engaged with the tire of the wheel is dispensed with.

In said above described views, like letters of reference indicate corresponding parts in each of the several figures of the two sheets of drawings.

Referring to said drawings, $b$ is the steering socket of the vehicle, $b'$ is the bifurcated end of the steering post, $b^2$ is the steering wheel, and $b^3$ is the back-bone of the frame of the vehicle.

The brake A, which is made of spring metal, is provided at its forward end with the portion $a$ having holes $a'$ therein, whereby said brake can be secured directly beneath the forked portion $b'$ of the vehicle, by means of suitable braces $c$, as in Fig. 1, or by means of suitable screws $c'$, as in Fig. 7. Said brake is preferably made of sheet metal, having formed on its rearwardly projecting body-portion $a^2$, and on the under side thereof, a curved brake-shoe $a^3$, while at or near the extreme back end of said brake A, may be formed or secured two oppositely extending foot-pieces $a^4$, by means of which, by placing the foot or feet on said foot-pieces, the brake-shoe can be brought into frictional engagement with the tire of the wheel $b^2$. Said brake shoe $a^3$ may be formed integral with the body $a^2$ of the brake, as illustrated in Fig. 3, or it may be secured to said body by means of rivets or screws $a^9$, as in Fig. $3^a$. If desired, said brake-shoe may be provided with the outwardly flaring end-portions $a^8$, which can be brought into frictional engagement with the sides of the tire $b^2$, as will be seen from said Fig. 3ª. Said foot-pieces $a^4$ may be flat, as indicated in Figs. 1 and 2, or they may be of any suitable shape, and in some cases I may provide them with suitable serrations or teeth $a^5$, as indicated in Fig. 8.

In connection with my novel form of spring brake herein-above described, I may use the locking device, illustrated in Figs. 1, 2, 4, 5, 6 and 7. Said locking or holding device consists essentially of a suitable frame $d$, which for convenience I will term a "stirrup." When this stirrup is used in connection with my brake A, I provide the lower end thereof with suitable pintles or eyes $a^6$, the stirrup being provided with a correspondingly arranged pintle or eye $d'$, whereby the latter can be pivotally connected with said brake A, by means of a pin $e$, as will be evident from the drawings. These parts may, however, be pivotally connected in any other well-known manner. Said stirrup $d$ is preferably made as illustrated in Figs. 4 and 6, having two downwardly extending arms $d^2$ and $d^3$. To one of said arms, as $d^2$, is pivoted a cross-piece $d^4$, the free end of which can be brought against the lower end of the other arm $d^3$, being held in this position by frictional contact with the head $f'$ of a pin or rivet $f$, see Fig. 1, or by means of a suitable spring $g$, as shown in Figs. 4 and 5.

In order to cause the arms $d^2$ and $d^3$ to embrace the back-bone or the tire of the vehicle, said cross-piece $d^4$ is caused to assume the dotted position indicated in Fig. 4, and when said stirrup has been adjusted, that its arms $d^2$ and $d^3$ do embrace, either said back-bone or the tire, as will be seen from Fig. 1, then said cross-piece $d^4$ is turned up against the head $f'$ of the pin or rivet $f$, or is forced underneath said spring $g$, whereby the steering wheel of the vehicle is held and can not turn on its axle, or, when the stirrup is in the dotted position indicated in Fig. 1, the said stirrup can not interfere with the wheel and the device can be used by the rider as a brake.

Sometimes the brake shoe $a^3$ has a rivet or pin $a^7$ thereon, as shown in Figs. 1, 2 and 7, with which the pivoted cross-piece $d^4$ can be brought into holding contact, as indicated in Fig. 2.

To prevent the velocipede from being stolen when the rider has left it, I have devised a means for locking the parts of the stirrup around the tire of the wheel. This may be done in several ways, either by a padlock $h$, having a staple $h'$ which is passed through holes $d^5$ in said arms $d^3$ and the cross-piece $d^4$, to be locked by means of a key, or, a lock $h^2$ may be secured directly upon said arm $d^3$, the locking tongue thereof engaging and locking with said cross-piece $d^4$, as will be understood from Fig. 6, or any other suitable locking means may be employed.

My invention is exceedingly simple in its construction, is durable and effectual when in use, can be manufactured at a small cost, and as a spring-brake is automatic in its operation.

It will be understood, that the spring-brake A can be used in connection with either wheel of a velocipede, and can be connected with the steering fork of the vehicle to project forwardly or rearwardly therefrom, as will be understood.

The spring-brake A, as has been stated, can also be used as a foot rest in coasting, being made of spring metal of sufficient stiffness to permit the rider to rest his feet upon the plate $a^2$, without causing the frictional contact of the brake shoe with the tire of the wheel.

Having thus described my invention, what I claim is—

1. In a velocipede, or other like vehicle, the combination, with the steering frame and its wheel, of a brake, adapted to be forced into frictional contact with the tire of the wheel, and a holding or locking device, consisting essentially of a stirrup pivotally connected with said brake, and said stirrup being adapted to be brought into holding or locked engagement with the tire of the wheel, substantially as and for the purposes set forth.

2. In a velocipede, or other like vehicle, the combination, with the steering frame and its wheel, of a brake A connected with said frame and adapted to be forced into frictional contact with the tire of the wheel, and a locking or holding device pivotally connected with said brake, comprising therein two arms $d^2$ and $d^3$, a cross-piece $d^4$ pivotally connected with one of said arms, and means for causing the holding contact of said cross-piece $d^4$ with the other of said arms, substantially as and for the purposes set forth.

3. In a velocipede, or other like vehicle, the combination, with the steering frame and its wheel, of a brake A connected with said frame and adapted to be forced into frictional contact with the tire of the wheel, and a locking or holding device pivotally connected with said brake, comprising therein two arms $d^2$ and $d^3$, a cross-piece $d^4$ pivotally connected with one of said arms, and a lock for causing the locked engagement of said cross-piece $d^4$ with the other of said arms, substantially as and for the purposes set forth.

4. A brake to be secured to the steering frame of a velocipede, made of spring metal and having a brake-shoe formed thereon, said brake being adapted to automatically adjust itself to a position above the wheel of the vehicle when the foot is removed from the brake, and a holding or locking device connected with said brake, consisting essentially of a stirrup pivotally connected with said brake, and said stirrup being adapted to be forced into holding or locked engagement with the tire of the wheel, substantially as and for the purposes set forth.

5. A brake to be secured to the steering frame of a velocipede, made of spring metal and having a brake shoe formed thereon, said brake being adapted to automatically adjust itself to a position above the wheel of the vehicle when the foot is removed from the brake, and a holding or locking device connected with said brake, adapted to be forced into holding or locked engagement with the tire of the wheel, said device consisting essentially of a stirrup having arms $d^2$ and $d^3$, a cross-piece $d^4$ pivotally connected with one of said arms, and means for causing the holding contact of said cross-piece $d^4$ with the other of said arms, substantially as and for the purposes set forth.

6. A brake to be secured to the steering frame of a velocipede, made of spring metal and having a brake shoe formed thereon, said brake being adapted to automatically adjust itself to a position above the wheel of the vehicle when the foot is removed from the brake, and a holding or locking device connected with said brake, adapted to be forced into holding or locked engagement with the tire of the wheel, said device consisting essentially of a stirrup having arms $d^2$ and $d^3$, a cross-piece $d^4$ pivotally connected with one of said arms, and a lock for causing the holding engagement of said cross-piece with the other of said arms, substantially as and for the purposes set forth.

7. The brake A of spring metal, having a brake-shoe on its under side and a pin or rivet $a^7$, in combination with a holding or locking device pivotally connected with said brake and adapted to be forced into holding or locked engagement with the tire of the wheel, substantially as and for the purposes set forth.

8. The brake A of spring metal, having a brake-shoe on its under side and a pin or rivet $a^7$, in combination, with a holding or locking device pivotally connected with said brake and adapted to be forced into holding or locked engagement with the tire of the wheel, said device consisting essentially of a stirrup having arms $d^2$ and $d^3$, a cross-piece $d^4$, and means for causing the holding contact of said cross-piece $d^4$ with the other of said arms, substantially as and for the purposes set forth.

9. The brake A of spring metal, having a brake-shoe on its under side and a pin or rivet $a^7$, in combination, with a holding or locking device pivotally connected with said brake and adapted to be forced into holding or locked engagement with the tire of the wheel, said device consisting essentially of a stirrup having arms $d^2$ and $d^3$, a cross-piece $d^4$, a lock for causing the holding engagement of said cross-piece $d^4$ with the other of said arms, substantially as and for the purposes set forth.

10. The brake A herein described, having a brake shoe $a^3$ struck up from the main portion $a^2$ of the brake, said shoe being bent downward and curved, substantially as set forth.

11. The brake A herein described, having a brake-shoe $a^3$ struck up from the main portion $a^2$ of the brake, said shoe being bent down and curved, and foot-pieces $a^4$ at or near the end of said main portion $a^2$, substantially as set forth.

In testimony that I claim the invention set forth above I have hereunto set my hand this 31st day of August, 1893.

GEORGE F. HALL.

Witnesses:
FREDK. C. FRAENTZEL,
FRED SCHLUETER.